(12) United States Patent
Holze et al.

(10) Patent No.: US 7,139,661 B2
(45) Date of Patent: Nov. 21, 2006

(54) INFORMATION AND CONTROL SYSTEM FOR VEHICLES

(75) Inventors: Harald Holze, Ecublens (CH); Miguel Ibanez, Geneva (CH); Philippe Schweizer, Lonay (CH)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 10/333,105

(22) PCT Filed: Jul. 10, 2001

(86) PCT No.: PCT/DE01/02570

§ 371 (c)(1),
(2), (4) Date: Oct. 1, 2003

(87) PCT Pub. No.: WO02/06772

PCT Pub. Date: Jan. 24, 2002

(65) Prior Publication Data

US 2004/0064248 A1    Apr. 1, 2004

(30) Foreign Application Priority Data

Jul. 15, 2000  (DE) ............................... 100 34 499

(51) Int. Cl.
*G01C 21/26* (2006.01)
(52) U.S. Cl. .................... 701/207; 701/36; 340/995.17
(58) Field of Classification Search ................. 701/36, 701/49, 200, 207, 209, 211; 340/995.1, 955.16, 340/995.17, 995.19, 438; 307/10.1, 10.8
See application file for complete search history.

(56) References Cited

U.S. PATENT DOCUMENTS

| | | | | |
|---|---|---|---|---|
| 6,049,749 A | * | 4/2000 | Kobayashi | 701/49 |
| 6,161,071 A | * | 12/2000 | Shuman et al. | 701/48 |
| 6,182,000 B1 | * | 1/2001 | Ohta et al. | 701/55 |
| 6,185,496 B1 | * | 2/2001 | Matsuno | 701/70 |
| 6,188,316 B1 | * | 2/2001 | Matsuno et al. | 340/441 |
| 6,353,785 B1 | * | 3/2002 | Shuman et al. | 701/48 |
| 6,405,128 B1 | * | 6/2002 | Bechtolsheim et al. | 701/208 |
| 6,735,515 B1 | * | 5/2004 | Bechtolsheim et al. | 701/208 |
| 6,817,740 B1 | * | 11/2004 | Kobayashi et al. | 362/486 |
| 2004/0111209 A1 | * | 6/2004 | Kagawa et al. | 701/93 |

FOREIGN PATENT DOCUMENTS

| | | |
|---|---|---|
| DE | 3700552 | 7/1988 |
| DE | 195 48 487 | 6/1997 |
| DE | 196 00 734 | 7/1997 |
| DE | 198 21 585 | 11/1999 |
| DE | 198 21 803 | 11/1999 |
| EP | 0 346 491 | 12/1989 |
| EP | 0 524 814 | 1/1993 |
| EP | 0 780 823 | 6/1997 |

(Continued)

*Primary Examiner*—Gary Chin
(74) *Attorney, Agent, or Firm*—Kenyon & Kenyon LLP

(57) ABSTRACT

An information and/or control system for a vehicle includes a positioning unit for determining a current geographic position of the vehicle, a map unit containing information at least regarding routes on which the vehicle may travel, and an interface unit for selective output of information from the map unit as a function of the current geographic position. Furthermore, information, referred to as a virtual traffic sign, regarding properties of a section of a drivable route is stored in the map unit in correlation with a geographic position along this route. This information is outputable by the interface unit when the distance of the vehicle from this geographic position is less than a limit value.

7 Claims, 3 Drawing Sheets

FOREIGN PATENT DOCUMENTS

| | | |
|---|---|---|
| EP | 0 995 973 | 4/2000 |
| GB | 2 289 560 | 11/1995 |

* cited by examiner

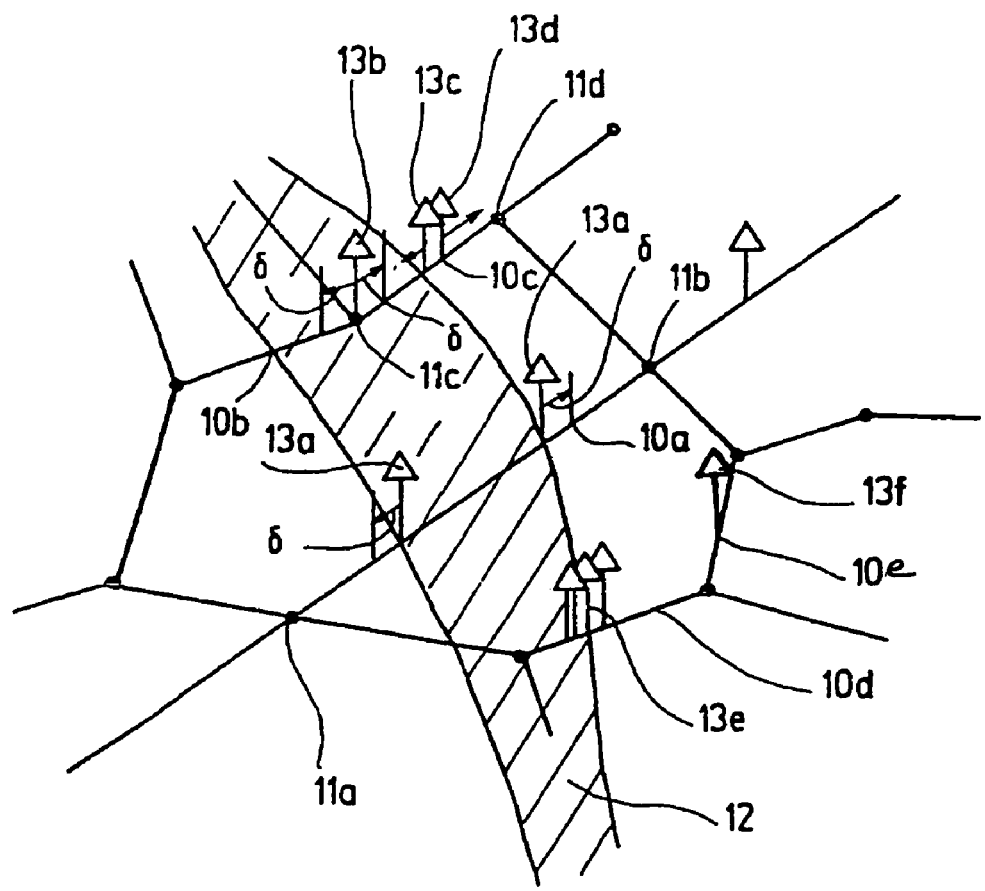

| #1 | X₁ | #2, #3,.. | Y₁ | #4, #5, | D₁ | S₁ₐ | X₁ₐ | S₁ᵦ | X₁ᵦ | ... |

| S₁ | → | 0 | ... |
| S₂ | ⇄ | ν | ... |
| ⋮ | ⋮ | ⋮ | |

Fig.5

INFORMATION AND CONTROL SYSTEM FOR VEHICLES

FIELD OF THE INVENTION

The present invention relates to an information and/or control system for a vehicle, including a positioning unit for determining a current geographic position of the vehicle, a map unit containing information at least regarding routes on which the vehicle may travel, and an interface unit for selective output of information from the map unit as a function of the current geographic position of the vehicle.

BACKGROUND INFORMATION

Such systems are used as vehicle navigation systems, for example. They include as the positioning unit a receiver for a satellite signal such as a GPS signal, which may be analyzed to obtain information regarding the current geographic position of the vehicle equipped with the navigation system with high accuracy. By comparing this position information with information stored in a map unit, such a system is capable of discovering from a plurality of routes, about which information is stored in the map unit, precisely that route on which the vehicle is located, and displaying the current position of the vehicle on a display screen via an interface unit, e.g., a map of the surrounding area. Such systems frequently also include an arrangement by which a user may input a destination into the system, whereupon the system selects a route to the desired destination on the basis of the information stored in the map unit and provides the driver continuously with information needed to follow this route in the course of the trip by drawing the attention of the driver (before reaching a turn) to the fact that he must leave the road on which he is currently driving and in which direction he must continue driving.

However, the information provided by the majority of such systems is limited to the minimum needed by a driver to follow a given route.

A first step in this direction of expanding the capabilities of these conventional information and control systems was discussed in German Published Patent Application No. 195 48 487, where the current position information obtained by a positioning unit with the help of a satellite signal and the information supplied by a map unit regarding the course of a route are used to control the alignment of the headlights of a vehicle adapted to the course of the road ahead of that is currently being traveled so that the headlights of the vehicle are deflected to the side even before reaching a curve to thereby illuminate the road in front of the vehicle for a longer distance than would be possible with traditional headlights.

This conventional system includes a control unit which receives information from the positioning unit regarding the current position of the vehicle and information from the map unit regarding the course and local topology of the road on which the vehicle is currently positioned. On the basis of the information regarding the course of the road in front of the vehicle, the control unit calculates continuously the required and/or optimum light distribution of the headlight system and controls the headlights accordingly.

This system requires a considerable computing power because the radius of curvature of the road in front of the vehicle must be constantly calculated in advance. Furthermore, its applicability is limited to controlling the vehicle headlights.

SUMMARY

The present invention provides an information and/or control system for a vehicle which makes it possible to take into account any properties of a route in front of the vehicle and to supply information regarding these properties to the driver or to trigger function groups of the vehicle directly as a function of these properties.

This is achieved by the fact that information, referred to as a virtual traffic sign, regarding properties of a section of a drivable route is stored in the map unit in correlation with a geographic position along this route and is outputable by the interface unit when the distance of the vehicle from this geographic position is less than the limit value. Due to the point-by-point assignment of information to a geographic position instead of to an extended section of road, operation of such a system is greatly simplified, because due to the fact that the information is assigned to an individual position, it is not necessary to have a prospective analysis of a complete section of roadway. In other words, to control, for example, the headlights of a vehicle so that they adapt to the course of the road using the system according to the present invention, it is sufficient if the light distribution of the headlights which is optimum for turning a corner is calculated a single time and stored in correlation with a geographic position. This calculation and correlation may expediently be accomplished already by the manufacturer of the system, i.e., the map unit. The information and/or control system according to the present invention need not have the computing power required for such calculations, and instead it is fully sufficient if the system is able to detect that the distance from the virtual traffic sign is less than the given limit distance.

The resulting reduction in computing power makes it possible, for example, to take into account a plurality of properties of the drivable route on which the vehicle is located in controlling the vehicle.

According to a first variant, the system may include a signal generator which receives the virtual traffic sign from the interface unit and outputs a message regarding this virtual traffic sign to a driver of the vehicle. This may allow the driver to adjust his driving to a potentially hazardous traffic situation ahead even before he himself is able to observe the hazardous situation. Such a message may be output by a speech output unit, for example, which may instruct the driver, for example, before driving into a tunnel to turn on the vehicle lights and remind him to turn the lights off again after exiting from the tunnel.

An alternative to this is the direct control of function groups of the vehicle as a function of a virtual traffic sign. For example, the interface unit may be connected to the lighting system of a vehicle and may automatically turn on the vehicle lights before driving into a tunnel and turn them off again after driving out of the tunnel.

Various types of virtual traffic signs are conceivable. For example, a distance limit value of 0 is assigned to a first type of such traffic signs, their geographic position being defined so that the vehicle reaches this geographic position shortly before it reaches the section to whose properties the virtual traffic sign refers. When applied to the case of the tunnel mentioned above as an example, this means that a virtual traffic sign having the meaning "turn on headlights" or "turn off headlights" is "set up" a short distance in front of the start of the tunnel and/or the end of the tunnel, respectively, and the instruction to turn on the lights is issued to the driver, or in the case of the second example, the control circuit automatically turns on the lights when the vehicle passes the position of the virtual traffic sign.

A direction may be assigned to virtual traffic signs of this type, with the effect that the interface unit outputs the virtual traffic sign only when the vehicle is approaching from the assigned direction.

In the case of another type of virtual traffic sign, the limit value of the distance below which the distance must fall for the virtual traffic sign to be outputable is different from 0. In this case, the geographic position of the virtual traffic sign may be located in the section of the route to whose properties the virtual traffic sign refers, because is it possible, through suitable determination of the limit value of the distance, to nevertheless ensure that the virtual traffic sign is output before the vehicle reaches the section of the route to which it refers. Such traffic signs may be in effect for both directions; therefore, they require less memory capacity than virtual traffic signs of the first type.

In addition, they make it possible to determine the limit value of the distance as a function of the speed of the vehicle. In other words, selecting this limit value to be larger as vehicle speed increases achieves the result that when the vehicle is traveling at a faster speed, the virtual traffic sign is output when the vehicle is a greater distance away from that section. Therefore, there remains enough time for the driver or a function group of the vehicle controlled by the interface unit to respond to the virtual traffic sign even when moving at a high speed.

The interface unit of the information and/or control system is expediently connected to at least one sensor of the vehicle and is therefore capable of outputting or not outputting the virtual traffic sign as a function of a detection result of the sensor. Such a sensor may be a sensor for ambient variables, e.g., a light/dark sensor which outputs a virtual traffic sign for turning on the vehicle lights at the entrance to a tunnel only in daylight but not at night. It may also be a sensor for variables inside the vehicle, e.g., a sensor which detects the on/off condition of a vehicle light switch and outputs the virtual traffic sign for turning the lights on or off only if the vehicle lights have been turned off at the switch.

Virtual traffic signs according to the present invention may be based on a plurality of different types of information. For example, the information regarding a route section may pertain to the following: a curve, an inclination, a bottleneck, a locally increased risk of black ice, e.g., in a subsidence area near a body of water, an object of tourist interest, a gas station, or a repair shop.

The information contained in the virtual traffic sign may also define a control response adapted to the properties of that section of road, e.g., it may include a shift command for an automatic transmission, an on/off command for headlights of the vehicle, as explained above, or a control command for controlling the light distribution of the headlights.

Furthermore, it is an object of the present invention is to provide a data carrier for an information and/or control system of the type indicated above which carries information regarding the geographic position of routes on which the vehicle may travel as well as virtual traffic signs, each being assigned to a geographic position along this route.

BRIEF DESCRIPTION OF THE DRAWINGS

FIG. 3 shows a data structure describing a route in the map shown in FIG. 2.

FIG. 4 shows a map similar to that shown in FIG. 2, but with virtual traffic signs.

FIG. 5 shows a data structure suitable for generating the map shown in FIG. 4.

DETAILED DESCRIPTION

Figure 1:
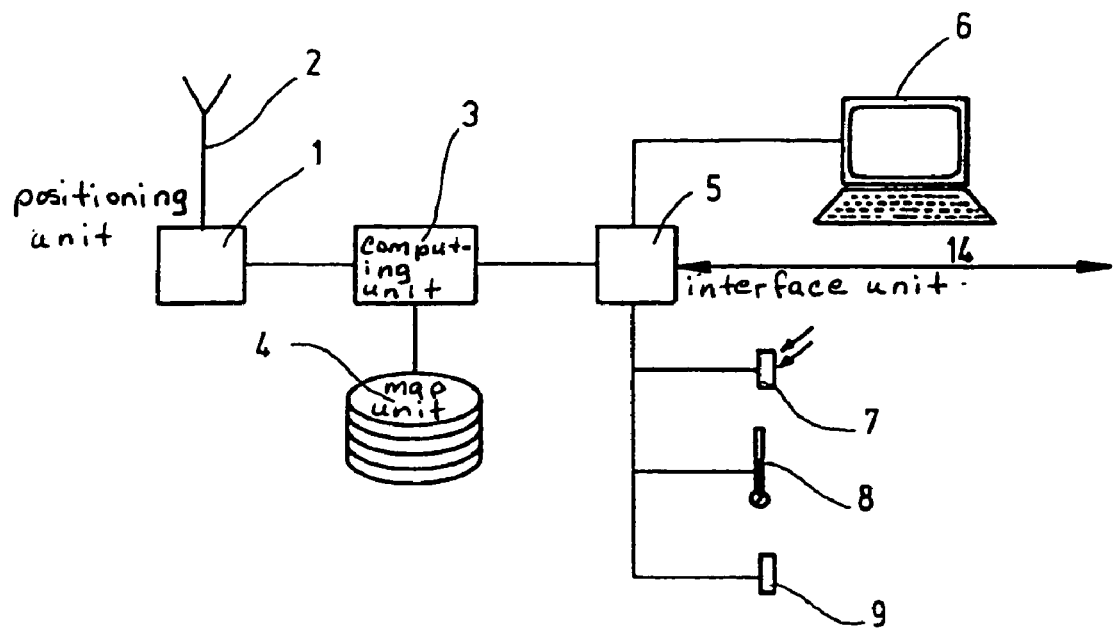
FIG. 1 shows an information and/or control system for a motor vehicle according to the present invention.

FIG. 1 shows on the basis of a block diagram an information and/or control system according to the present invention for a motor vehicle. It includes a positioning unit 1 for determining a current geographic position of a vehicle. In the example in question here, it is a GPS unit which receives GPS satellite signals with the help of an antenna 2 and calculates a current geographic position of the vehicle from these signals; instead of or in addition to the GPS unit, the positioning unit could also be equipped with instruments such as a gyrometer or an odometer for a compound navigation system.

Connected to positioning unit 1 is a computing unit 3, which determines the relationship between the current position information supplied by positioning unit 1 and information supplied by a map unit 4 regarding the geographic positions of routes the vehicle may take. Map unit 4 may be configured, for example, as a CD-ROM drive which holds one or more CD-ROMs containing map information.

By linking the information supplied by positioning unit 1 and map unit 4, computing unit 3 is able to determine the current geographic position of the vehicle with greater accuracy than is possible at the present time in civilian use of a GPS system alone or with other conventional techniques of instrumental position determination. This is achieved, for example, because computing unit 3 assumes that the vehicle may be located only on routes stored in map unit 4. If current position information supplied by positioning unit 1 is not unambiguously correlatable with such a route, then positioning unit 1 may additionally link the direction of movement of the vehicle, which may be determined via positioning unit 1, with the direction of the routes and thus may arrive at an unambiguous position determination.

Computing unit 3 is connected to a console 6 in the passenger compartment via an interface unit 5, the console including a display screen for displaying map information and including a control panel. The control panel is used, for example, to allow a driver of the vehicle to input a trip destination, whereupon computing unit 3 may work out a good route recommendation on the basis of the map information and display it on the screen of console 6. A loudspeaker for output of voice messages to the driver may also be present in the passenger compartment.

Furthermore, interface unit 5 is connected to a plurality of sensors, namely here a brightness sensor 7, an outside temperature sensor 8, and a humidity sensor 9.

A possible connection to a data bus of the vehicle, such as a MOST network or a LAN network, is labeled as 14. This may allow exchange of data files or information in general with other control units in the vehicle or with other sensors. Brightness sensor 7, outside temperature sensor 8, and humidity sensor 9 may also communicate with interface unit 5 via connection 14 and the bus—in deviation from the exemplary embodiment illustrated in the figure.

Figure 2:
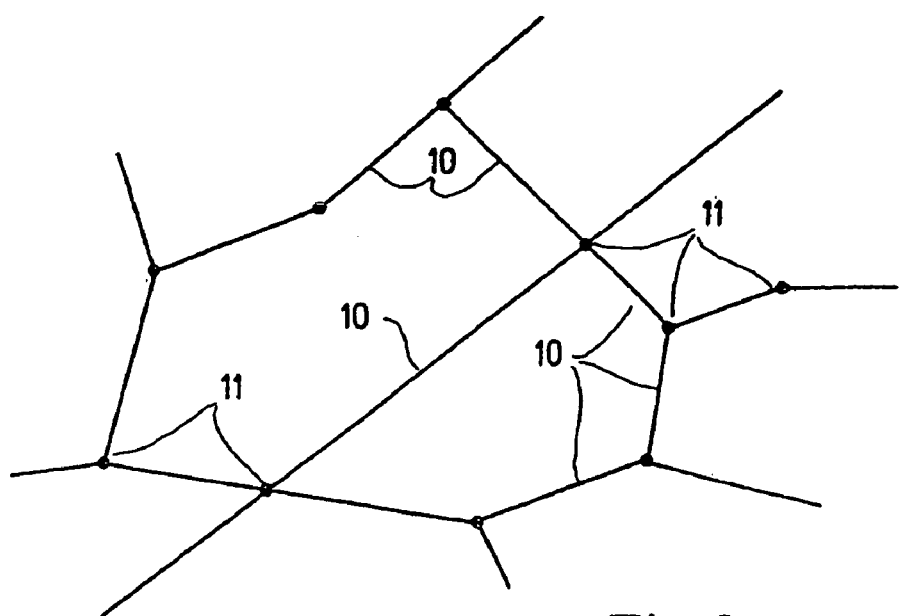
FIG. 2 shows a map displayable by the information and control system on the basis of information stored in a traditional map unit.

FIG. 2 shows an idealized diagram of a map detail such as that which could be displayed on the screen of console 6.

The map detail is composed of a plurality of routes 10, each connecting two nodes 11. Depending on the scale of the map, nodes 11 may be residential areas, intersections of interregional roads, or highway on and off ramps as well as street intersections and junctions within a residential area.

Each route 10 is completely characterizable by the data structure illustrated in FIG. 3. In this data structure, one row is assigned to each route, each row containing in a first column a designation of the route, such as designation #1 for the first route of the data structure, #2 for the second, etc.

A second column shows geographic coordinates $X_1$ of a beginning node of this route, and a third column shows designations #2, #3 of other routes leading away from or ending at this beginning node. Columns 4 and 5 each contain coordinates $Y_1$ of an end node of the route and designations #4, #5 of routes leading away from or ending at this end node. Finally, information regarding length $D_1$ or, if necessary, information $t_1$ regarding the presumed driving time of the route, may also provided for each route.

Each route is thus characterized by the position of its beginning node and/or end node, the routes connected to them, and a measure of the length and/or the driving time of the route.

FIG. 4 shows the same map detail as FIG. 2, provided with virtual traffic signs according to the present invention. Hatched strip 12 extending diagonally through the map detail represents a valley. Route 10a is, for example, a section of highway between two on-ramps 11a, 11b. It includes a bridge spanning the valley. The two heads of the bridge are each assigned virtual traffic signs 13a having the meaning "danger of side winds" in the data in map unit 4. These virtual traffic signs 13a are provided so they may be output in the form of a visual or acoustic warning message to the driver of the vehicle when approaching the bridge. Therefore, a direction is assigned to the virtual traffic signs, to ensure that they are output only when the vehicle approaches the bridge but not on leaving the bridge. Furthermore, they are assigned a speed-dependent limit value δ of the distance so that the virtual traffic sign 13a is output when the distance of the vehicle is less than the limit value of the distance from virtual traffic sign 13a. This limit value δ increases with an increase in speed, i.e., the driver is warned of the hazard at a distance from the bridge, the distance becoming greater as his speed increases to provide an opportunity to adjust the speed of the vehicle without abrupt braking.

Routes 10b, 10c lead through valley 12 on flat ground via node 11c. A virtual traffic sign 13b having the meaning "black ice warning" is assigned to node 11c here. This virtual traffic sign 13b is operative in both directions and is also assigned a minimum distance δ which depends on vehicle speed.

Since this virtual traffic sign 13b is relevant to safety only at certain outside temperatures, it is output as a warning message to the driver by interface unit 5 only when outside temperature sensor 8 reports temperatures near freezing point or lower.

Route 10c leads out of the valley at a considerable slope. Therefore, two virtual traffic signs are assigned to it in FIG. 4, a first sign 13c which is effective only for a vehicle coming out of valley 12, causing the vehicle, if it includes automatic transmission, to shift to a lower gear at the beginning of the slope. A limit distance value of 0 may be assigned to this traffic sign 13c, i.e., it becomes operative only when the vehicle has passed its position.

Virtual traffic sign 13d contains a warning of a descending gradient and is operative only for vehicles traveling toward the valley.

Route 10d, also leading out of valley 12 to the elevation, contains a series of sharp curves. Therefore, route 10d is assigned a group of virtual traffic signs 13e containing instructions regarding the direction in which the vehicle headlights, if they are adjustable, are to be pointed to illuminate the roadway in the area of each curve as thoroughly as possible. Since virtual traffic signs 13e supply all the information needed for controlling the headlights, it is not necessary for the resolution of the maps in map unit 4 to be fine enough to permit a calculation of the radius of curvature of turns before driving through them. Computing unit 3 therefore uses a relatively low processing power, but it is nevertheless capable of taking into account virtual traffic signs having a variety of different informational contents and intervening in the control of the vehicle in accordance with this informational content or warning the driver.

Processing in computing unit 3 is especially efficient if the various different virtual traffic signs are each assigned the same speed-dependent distance limit value or a distance limit value of 0. In this case, it is sufficient for detection of all virtual traffic signs arranged on the route that such virtual traffic signs, which the vehicle "passes by" directly or which are in the speed-dependent limit distance, are detected. A predictive analysis of the representation of the route in map unit 4 over a nonspecific length of route is not necessary.

The concept of the virtual traffic sign according to the present invention is not only suitable for warning the driver of a vehicle of hazardous situations on the road or automatically intervening in control of the vehicle, but they may also perform other functions which make driving more efficient or more pleasant. For example, a virtual traffic sign 13f is located on route 10e, indicating a lookout point or a parking place from which the lookout point is easily reached by foot. Such virtual traffic signs may be used for tourist attractions of any type.

An operating element is expediently provided on console 6, making it possible for the driver to activate or block output of virtual traffic signs having a certain meaning content. Such a possibility is not only appropriate for virtual traffic signs pointing out tourist attractions, but the same possibility may also be used, for example, for virtual traffic signs pointing out parking places, service stations, repair shops, or the like.

Figure 5:
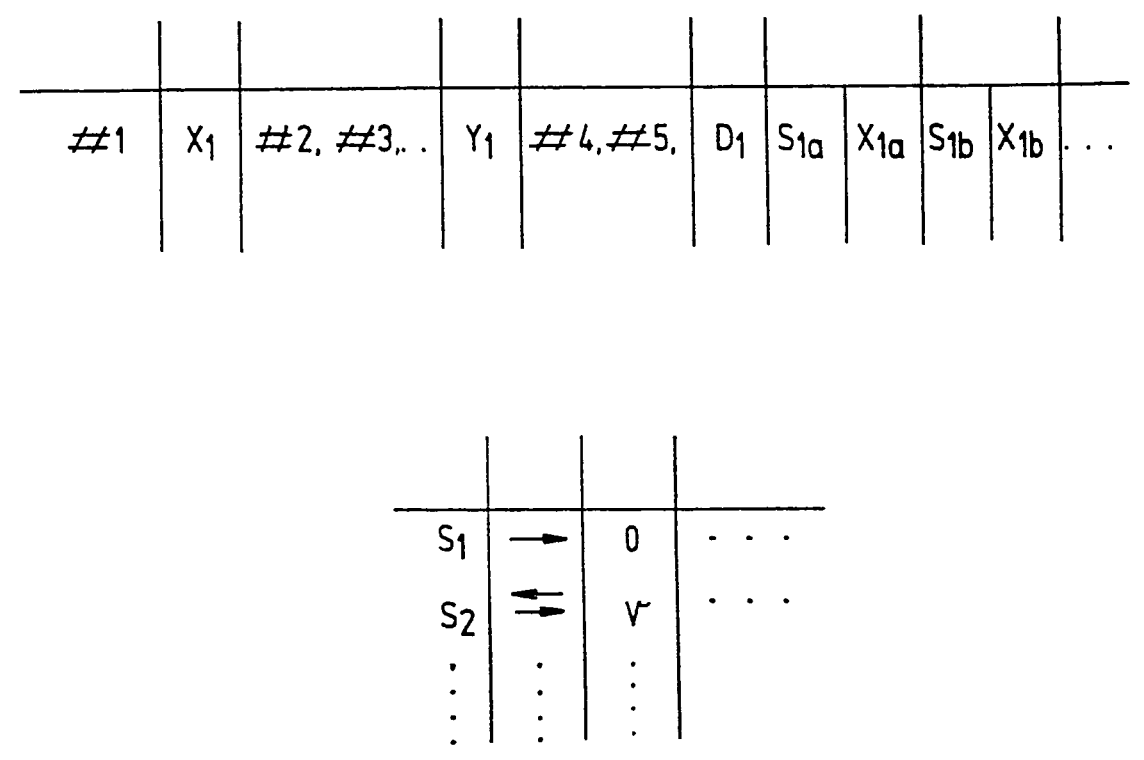

FIG. 5 shows, by analogy with FIG. 3, the expanded data structure with which a route in map unit 4 is displayed according to the present invention. The first data fields of the display of each route, including the name of the route, beginning nodes and end nodes and the roads connected to it as well as its length are the same as those in FIG. 3. In addition, each route includes data fields for each virtual traffic sign of this route, characterizing its type $s_{1a}$, $s_{1b}$, ... and its position $x_{1a}$, $X_{1b}$, ..., as well as including a data field for the different types of virtual traffic signs, representing a designation $s_1$, $S_2$ ... for each type of traffic sign, i.e., an indication as to whether the traffic sign is effective in one or both directions, represented here by one or two arrows, an indication as to whether the limit value of the distance for the virtual traffic sign is zero or whether it depends on speed, and information regarding the measures to be taken on output of the virtual traffic sign by the interface unit.

What is claimed is:

1. A system for providing at least one of information and control for a vehicle, comprising:

a positioning unit for determining a current geographic position of the vehicle;

a map unit storing information regarding at least one travel route available for the vehicle, including information regarding properties of a plurality of sections of the at least one travel route, information regarding each section of the at least one travel route being stored in correlation with a corresponding geographic position along the at least one travel route; and an interface unit for providing selective output of information from the map unit as a function of the current geographic position of the vehicle, including information regarding properties of a selected section of the at least one travel route stored in the map unit, when the distance of the vehicle from a geographic position corresponding to the information regarding the selected section of the at least one travel route is less than a limit value, wherein the interface unit is configured to control a plurality of function groups of the vehicle as a function of the information regarding properties of the selected section of the at least one travel route, wherein:

a predetermined direction is assigned to the information regarding properties of the selected section of the at least one travel route, the interface unit outputs the information regarding properties of the selected section only when the vehicle is approaching along the predetermined direction, the limit value is different than zero, the geographic position of the information regarding properties of the selected section of the at least one travel route is within the selected section of the at least one travel route, and the limit value is determined as a function of a speed of the vehicle.

2. The system of claim 1, further comprising:

a signal generator for receiving the information regarding properties of the selected section of the at least one travel route from the interface unit and for outputting a message to a driver of the vehicle.

3. The system of claim 1, wherein the limit value is zero, and wherein the geographic position of the information regarding properties of the selected section of the at least one travel route is such that the vehicle reaches the geographic position of the information shortly before the vehicle reaches the selected section of the at least one travel route.

4. The system of claim 1, wherein the interface unit is connected to at least one sensor of the vehicle and selectively outputs the information regarding properties of the selected section of the at least one travel route as a function of a detection result of the at least one sensor.

5. The system of claim 1, wherein the information regarding properties of the selected section of the at least one travel route includes information regarding at least one of a curve, an inclination, a bottleneck, an increased risk of ice, an object of tourist interest, a gas station, and a repair shop.

6. The system of claim 1, wherein the information regarding properties of the selected section of the at least one travel route includes information regarding at least one of a shift command for an automatic transmission, an on/off command for headlights of the vehicle, and a control command for controlling a light distribution of the headlights.

7. The system of claim 1, further comprising:

a data carrier for carrying information regarding geographic position of the at least one travel route and the information regarding properties of the plurality of sections of the at least one travel route.

* * * * *